(12) United States Patent
Neubauer

(10) Patent No.: US 11,307,605 B2
(45) Date of Patent: Apr. 19, 2022

(54) PEDAL VALUE GENERATOR FOR A MOTOR VEHICLE, PEDAL VALUE GENERATOR ARRANGEMENT AND METHOD FOR CONTROLLING A MOTOR VEHICLE

(71) Applicant: AB ELEKTRONIK GMBH, Werne (DE)

(72) Inventor: Dirk Neubauer, Nachrodt-Wiblingwerde (DE)

(73) Assignee: AB ELEKTRONIK GMBH, Werne (DE)

( * ) Notice: Subject to any disclaimer, the term of this patent is extended or adjusted under 35 U.S.C. 154(b) by 0 days.

(21) Appl. No.: 17/071,306

(22) Filed: Oct. 15, 2020

(65) Prior Publication Data

US 2021/0149432 A1    May 20, 2021

(51) Int. Cl.
*G05G 1/30* (2008.04)
*B60K 26/02* (2006.01)
(Continued)

(52) U.S. Cl.
CPC ............ *G05G 1/305* (2013.01); *B60K 26/02* (2013.01); *B60T 7/042* (2013.01); *B60T 7/06* (2013.01); *G05G 1/40* (2013.01); *G05G 1/44* (2013.01); *G05G 9/00* (2013.01); *B60K 2026/026* (2013.01); *B60T 2220/04* (2013.01);
(Continued)

(58) Field of Classification Search
CPC ............ G05G 1/305; G05G 1/38; G05G 1/36; G05G 1/405; G05G 1/40; G05G 1/44; G05G 1/445; G05G 1/60; G05G 1/30; G05G 9/00; B60K 26/02; B60K 2026/026; B60K 2026/025; B60T 7/042; B60T 7/06; B60T 2220/04; Y10T 74/20894; Y10T 74/20888; Y10T 74/2054; Y10T 74/20918;
(Continued)

(56) References Cited

U.S. PATENT DOCUMENTS

| 2,090,152 A | * | 8/1937 | Porter | B60K 23/02 192/85.58 |
| 3,024,327 A | * | 3/1962 | Van Meter | H01H 21/26 200/61.29 |

(Continued)

FOREIGN PATENT DOCUMENTS

| DE | 10012165 A1 | * | 9/2001 | G05G 1/405 |
| DE | 10118436 A1 | * | 10/2002 | B60W 10/06 |

(Continued)

*Primary Examiner* — Daniel D Yabut
(74) *Attorney, Agent, or Firm* — Dority & Manning, P.A.

(57) ABSTRACT

A pedal value generator 14 for a motor vehicle 30, a pedal value generator arrangement 10 and a method for controlling a motor vehicle 30 are described. A first pedal actuating surface 16 and, at a distance thereto, a second pedal actuating surface 18 are arranged on a cross member 20. A sensor arrangement 24 detects a torque M of the cross member 20 with respect to a torque axis X arranged between the first and second pedal actuating surfaces 16, 18 and for supplying an electrical actuation signal B1, B2 as a function of torque M. When an actuating force acts upon first pedal actuating surface 16 motor vehicle 30 can be accelerated and when an actuating force acts upon second pedal actuating surface 18 it can be decelerated.

9 Claims, 4 Drawing Sheets

(51) Int. Cl.
  *B60T 7/04* (2006.01)
  *B60T 7/06* (2006.01)
  *G05G 1/40* (2008.04)
  *G05G 1/44* (2008.04)
  *G05G 9/00* (2006.01)

(52) U.S. Cl.
  CPC ....... *B60T 2220/06* (2013.01); *B60Y 2300/18* (2013.01); *B60Y 2400/307* (2013.01); *B60Y 2400/81* (2013.01)

(58) Field of Classification Search
  CPC ........ Y10T 74/20534; Y10T 74/20528; H01H 21/26
  See application file for complete search history.

(56) References Cited

U.S. PATENT DOCUMENTS

| | | | | |
|---|---|---|---|---|
| 3,240,299 | A * | 3/1966 | Buchwald | B60W 10/18 477/211 |
| 3,386,541 | A * | 6/1968 | Luijt | B60W 10/18 477/212 |
| 4,404,439 | A * | 9/1983 | Leighton | B60Q 1/441 200/61.89 |
| 6,357,232 | B1 * | 3/2002 | Strashny | B66F 9/06 60/431 |
| 9,501,083 | B2 * | 11/2016 | Zhou | B60K 26/02 |
| 10,401,892 | B2 * | 9/2019 | Abu Al-Rubb | B60W 30/18181 |
| 2001/0015111 | A1 * | 8/2001 | Rixon | G05G 1/405 74/512 |
| 2010/0087975 | A1 * | 4/2010 | Dower | B60L 15/20 701/22 |
| 2010/0313694 | A1 * | 12/2010 | Aoki | B25J 19/0029 74/490.02 |
| 2011/0056327 | A1 * | 3/2011 | Mazzucchi | B62D 11/006 74/512 |

FOREIGN PATENT DOCUMENTS

| | | | |
|---|---|---|---|
| DE | 101 48 281 | 1/2003 | |
| DE | 100 48 737 | 2/2003 | |
| DE | 601 17 193 | 9/2006 | |
| DE | 11 2008 000 262 | 1/2010 | |
| DE | 102018219487 A1 * | 5/2020 | ............ B60K 26/02 |

* cited by examiner

PEDAL VALUE GENERATOR FOR A MOTOR VEHICLE, PEDAL VALUE GENERATOR ARRANGEMENT AND METHOD FOR CONTROLLING A MOTOR VEHICLE

PRIORITY CLAIM

The present application is based on and claims priority to German Application 10201930979.4 having a filing date of Nov. 15, 2019, which is incorporated by reference herein.

The invention relates to a pedal value generator for a motor vehicle, a pedal value generator arrangement and a method for controlling a motor vehicle.

Conventional pedal value generators for motor vehicles usually comprise an accelerator pedal ("gas pedal") arranged in a legroom, and a brake pedal. Conventional pedals usually comprise a pedal actuating surface which, for example, can be arranged on a pedal arm and, when actuated against a restoring force, assumes a pivot position which is dependent on the actuating force. In the case of accelerator pedals, drive-by-wire systems are common in which there is no mechanical transmission of the pedal position to actuators of the drive, such as throttle valves, but instead a sensor determines the pedal position and thus the degree of actuation and the drive is controlled in accordance with the signal derived therefrom. In the case of brake pedals, on the other hand, a mechanical transmission of the pedal movement to members of the brake system of the vehicle is common at present.

DE 10 2010 063 053 A1 proposes a pedal value generator arrangement for a motor vehicle with an accelerator pedal and a mounting for it. In this case, the accelerator pedal is mounted rigidly. A force sensor detects a force applied to the accelerator pedal by foot, so that depending on said force the performance of a drive motor of the motor vehicle can be controlled.

It can be regarded as an object to propose a pedal value generator, a pedal value generator arrangement and a method for controlling a motor vehicle which, despite their simple construction, enable a comprehensive control.

The object is achieved by a pedal value generator according to claim 1, a pedal value generator arrangement according to claim 10 and a method according to claim 11. Dependent claims relate to advantageous embodiments of the invention.

The pedal value generator according to the invention comprises a cross member with a first pedal actuating surface and a second pedal actuating surface arranged at a distance from the first pedal actuating surface, as well as a sensor arrangement for detecting a torque of the cross member with respect to a torque axis arranged between the first and second pedal actuating surfaces and for supplying an electrical actuation signal as a function of the torque.

In contrast to conventional, individually movable pedals, such as, for example, separate accelerator pedals and brake pedals, the pedal value generator according to the invention comprises two separate actuating surfaces arranged at a distance from one another on a common cross member. Said actuating surfaces are preferably spaced apart in a direction that can be referred to as the transverse direction, i.e., in the lateral direction, based on the installation position in a motor vehicle and the foot operation by a driver.

The actuating surfaces are arranged in such a way that, when a pedal actuating surface is actuated, i.e., a force is applied, for example by foot actuation, a torque is acting upon the cross member. In this case, the torque axis runs vertically in the installation position, for example. The direction of the torque is dependent on whether the actuation is acting upon the first or the second actuating surface.

Thus, the detection of the torque according to the invention can supply an electrical actuation signal that is on the one hand depending on the direction of the torque, i.e., actuation of either the first or the second pedal actuating surface and on the other hand depending on the degree of actuation, i.e., the acting force.

Thus, the pedal value generator according to the invention can perform the function of two conventionally separately arranged pedals with a very simple construction. This results in significant potential savings.

This allows for a movable arrangement of the cross member, for example with an angular position or deflection dependent on an actuating force. A restoring force can then act to return the cross member to an initial position. According to a preferred embodiment of the invention it is preferred, however, that the cross member can be arranged at least substantially rigidly. This is understood to mean preferably that no joint is provided for the pivotable mounting of the cross member. On the other hand, a rigid arrangement is not necessarily to be understood in such a way that even when large actuating forces act upon the pedal actuating surfaces, at least slight movements could not occur, for example due to elastic deformation of the cross member or an arm or other attachment part on the cross member. By dispensing with a movement mechanics, for example with a joint and a restoring member, a significantly simplified structure is achieved. By detecting the torque, it is nevertheless possible to implement not only the detection of the direction of actuation but also the degree of actuation.

For example, a rigid arrangement of the cross member can be understood to mean that its ends, that is to say the pedal actuating surfaces, are shifted by an actuation path of merely no more than a maximum of 20 mm, for example, preferably no more than 10 mm from the non-energized starting position, when normal foot actuating forces are exerted (for example, a maximum of 30 N).

Any suitable type of sensor can be used to detect the torque. Possible and preferred is the use of a single sensor in the region of the torque axis. For example, a torque sensor can have a first sensor part and a second sensor part, coupled together via a torsion member in such a way that they are displaced and/or twisted relative to one another upon action of a torque. The relative movement of the two sensor parts can, for example, be determined by means of a suitable sensor technology, e.g., inductively, optically, potentiometrically, capacitively, etc. and thus a magnitude of the torque can be obtained. However, alternative sensor arrangements are possible, too, for example, by means of one or more strain gauges. Furthermore, the use of at least two force sensors arranged at a distance is conceivable, it being possible to determine a torque from a difference in the detected forces.

According to a preferred further development of the invention the cross member is arranged at a pedal arm. This may be, for example, an arm protruding into the legroom. The pedal arm can preferably extend, for example, at an angle to the cross member, particularly preferably at least substantially at a right angle thereto. While a pedal arm pivotable upon actuation would be possible, the pedal arm is preferably rigidly arranged with respect to the action of force on the first and/or second pedal actuating surfaces. In this case, a rigid arrangement, as already explained above with regard to the cross member, is not necessarily understood to mean that there is no movement or deformation under the action of actuating forces, but particularly preferably that devices for guiding the movement, for example a joint and/or, for example, a separate spring for resetting are dispensed with.

The pedal arm can be arranged pivotably between an operating position and a rest position. In this case, for example, in the operating position the pedal arm can protrude within a legroom, so that the pedal actuating surfaces are positioned for operation. In the rest position, on the other hand, the pedal arm, the cross member and/or the pedal actuating surfaces can be pivoted away, so that a larger free area remains in the legroom. The pivot axis of the pedal arm can, for example, be arranged at least substantially horizontally in the legroom. Further preferably, the pivot axis is at an angle to the torque axis, in particular at least substantially at a right angle.

According to a further development of the invention, a locking member can be provided for locking the pedal arm in the operating position. In this case, the pedal arm can behave rigidly when it is actuated.

According to a preferred embodiment, a member can be provided for the active adjustment of the pedal arm. This can be, for example, an electromotive adjustment. Preferably, it can be a cylinder member, e.g., a pressure cylinder with hydraulic or pneumatic functions. In this way, for example, the pedal arm can be pivoted or otherwise adjusted between the operating position and the rest position.

According to a further development of the invention, a separating member can be arranged between the first and second pedal actuating surfaces, the separating member extending at least substantially perpendicular to one or both pedal actuating surfaces or, in the case of differently oriented parts of the pedal actuating surfaces, such as in the case of a curvature, to a part thereof. Thus, preferably, the separating member therefore towers above one, preferably both pedal actuating surfaces. For example, the separating member can be a pin or preferably a partition member. With such a separating member between the pedal actuating surfaces, slipping of the foot from one pedal actuating surface to the other pedal actuating surface can be avoided as well as simultaneous actuation of both, so that either one or the other pedal actuating surface is consciously actuated.

Preferably, the first and second pedal actuating surfaces are arranged at least substantially in parallel to one another. According to a preferred embodiment, it is further preferred that the first pedal actuating surface is arranged offset relative to the second pedal actuating surface. In this case, there is preferably an offset in the actuation direction, i.e., in a direction at least substantially perpendicular to the pedal actuating surfaces, or, in the case of a curvature, perpendicular to at least a part, preferably a central region of the pedal actuating surfaces. For actuation, one of the pedal actuating surfaces can be arranged further back than the other pedal actuating surface. In this way, the pedal actuating surfaces are easy to distinguish during operation and unintentional incorrect operation can be avoided.

The pedal value generator according to the invention is preferably to be arranged in the legroom of a motor vehicle. Preferably, an evaluation unit is provided for evaluating the actuation signal and/or directly the detected torque. The evaluation unit can supply an acceleration signal and/or a brake signal. For this purpose, the evaluation unit is coupled to a control unit of the motor vehicle in such a way that the signals are delivered to the control unit. Preferably, one pedal actuating surface is used as the accelerator pedal and the other pedal actuating surface is used as the brake pedal, i.e., actuation of the one pedal actuating surface results in an acceleration signal and actuation of the other pedal actuating surface results in a brake signal.

Embodiments of the invention are described in more detail below with reference to drawings. In the figures, FIGS. 1, 2 show a perspective view of a pedal value generator arrangement in the legroom of a motor vehicle in a perspective view and a side view;

Figure 1:
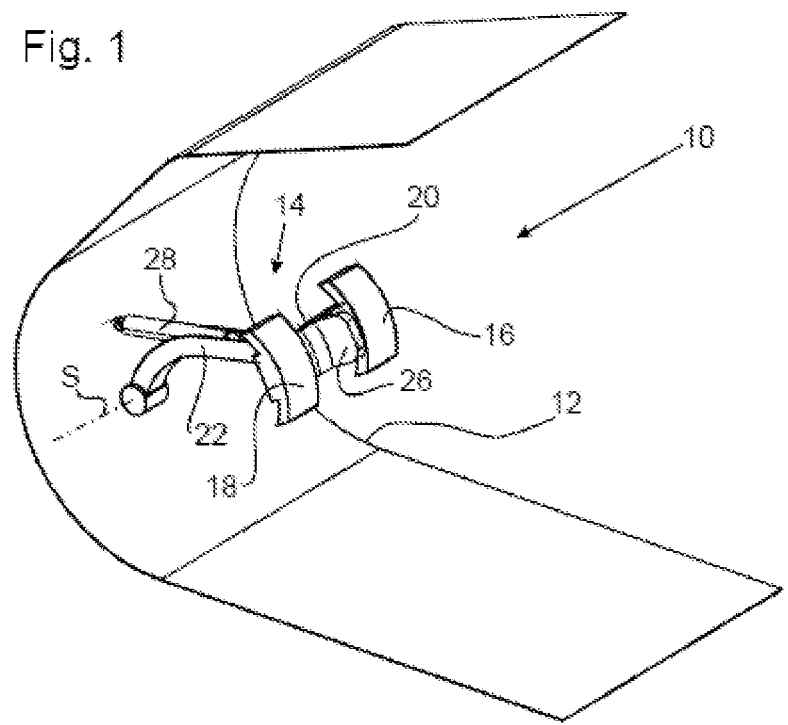
Figure 2:
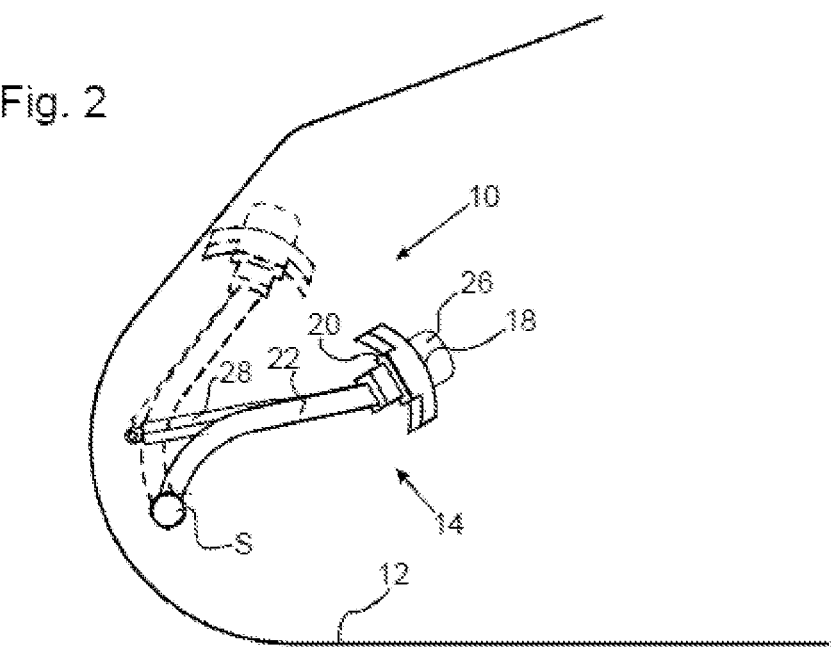

FIG. 1, FIG. 2 show a pedal value generator arrangement 10 in a legroom 12 of a motor vehicle. Pedal value generator arrangement 10 comprises a pedal value generator 14 having a first pedal actuating surface 16 functioning as an accelerator pedal and a second pedal actuating surface 18 functioning as a brake pedal.

Figure 3:
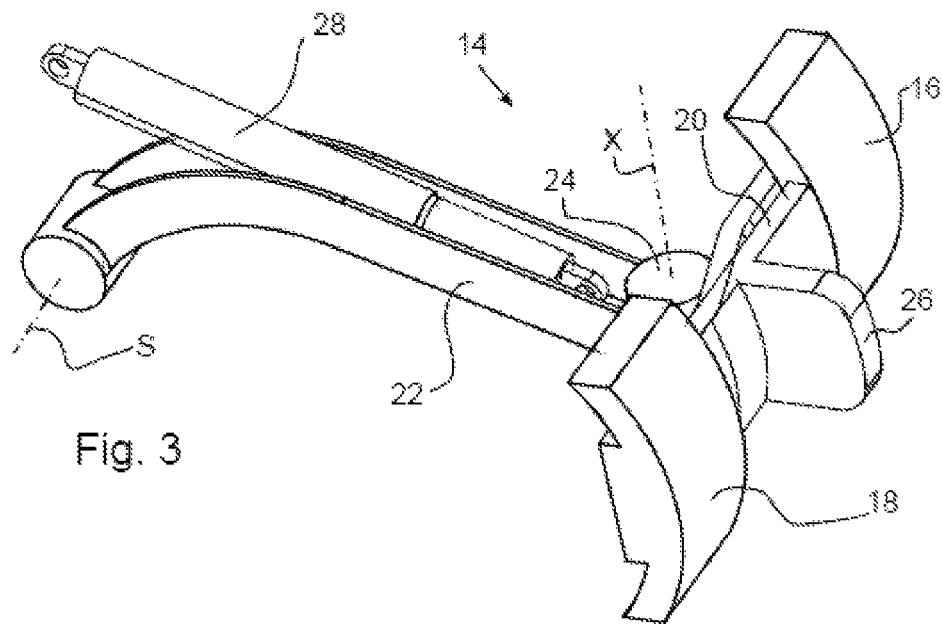
FIGS. 3, 4 show a pedal value generator of the pedal value generator arrangement from FIGS. 1, 2 in perspective view and top view.
Figure 4:
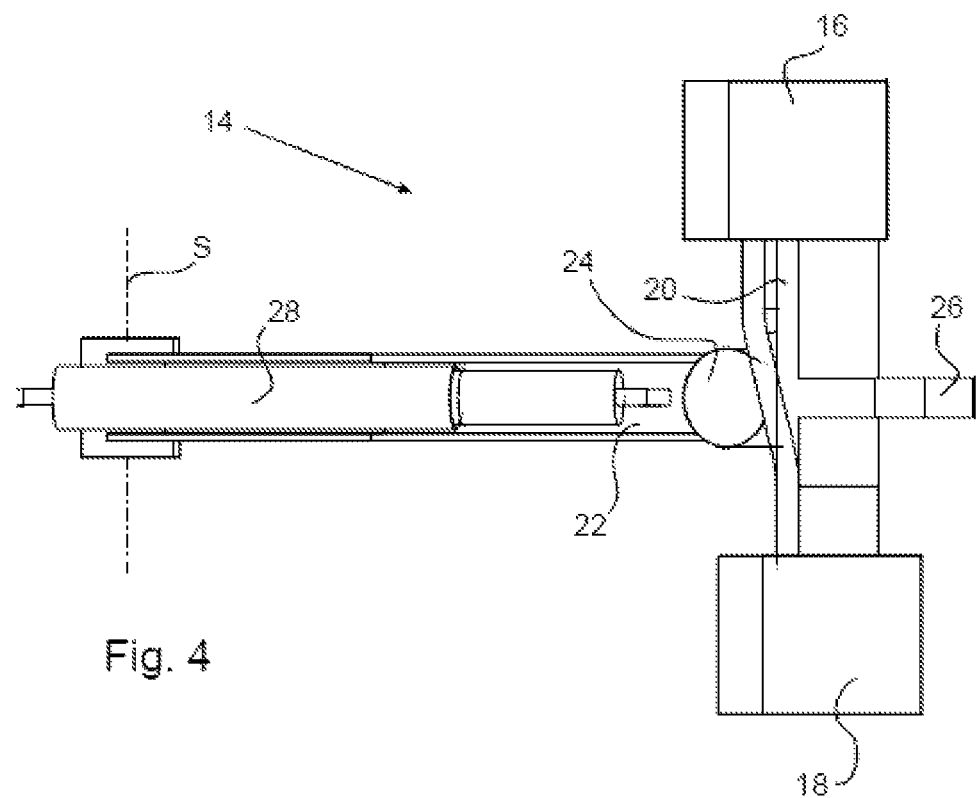

The pedal actuating surfaces 16, 18 are arranged at opposite ends of a cross member 20 which is attached to an arm which is protruding into the legroom 12. FIGS. 3, 4 show the pedal value generator 14 in more detail. Cross member 20 is arranged at a right angle at the end of arm 22 and rigidly attached to arm 22. A torque sensor 24 is arranged to detect a torque M acting upon cross member 20 with respect to a torque axis X.

Figure 5:
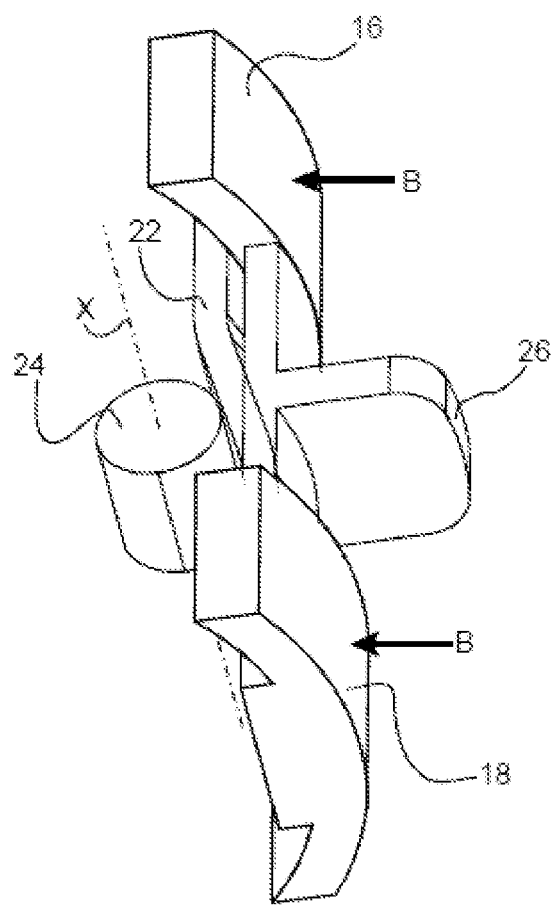
FIG. 5 shows pedal actuating surfaces of the pedal value generator from FIGS. 3, 4 in another perspective view.

The pedal actuating surfaces 16, 18 are each domed and arranged in parallel to one another. Here, as can be seen in particular also in FIG. 5, they are arranged offset in an actuating direction B that is oriented perpendicular to the respective central region of the curved pedal actuating surfaces 16, 18. In this case, the first pedal actuating surface 16 on the right-hand side is located further back in actuating direction B than the second pedal actuating surface 18 on the left-hand side.

A partition wall 26 is arranged between the pedal actuating surfaces 16, 18. Partition wall 26 is formed integrally with a part of cross member 22 and extends between pedal actuating surfaces 16, 18 in parallel to actuating direction B, i.e., perpendicular to the respective central region of pedal actuating surfaces 16, 18.

Arm 22 is attached in legroom 12 and can be pivoted about a pivot axis S so that it can be pivoted from the protruding actuation position (solid lines) to a rest position (dashed lines in FIG. 2) as shown in FIG. 2. The pivoting movement is predetermined by a cylinder member 28. Cylinder member 28 is controlled by a controller (not shown) in order to bring pedal value generator 14 into the rest position or actuation position. In the actuation position, cylinder member 28 causes arm 22 to be locked so that it remains rigid when actuated.

Figure 6:
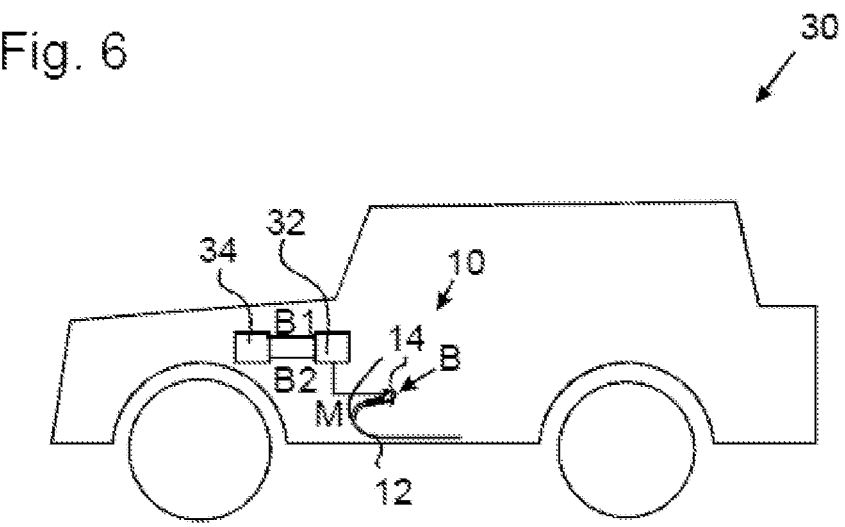
FIG. 6 shows a schematic illustration of a motor vehicle with the pedal value generator arrangement from FIG. 1, 2.

FIG. 6 shows schematically pedal value generator arrangement 10 within a motor vehicle 30. The drive of motor vehicle 30 is controlled by means of actuating pedal value generator 14 in legroom 12 of motor vehicle 30.

As already explained, first pedal actuating surface 16 arranged on the right-hand side serves as an accelerator pedal and second pedal actuating surface 18 arranged on the left-hand side serves as a brake pedal. The actuation is carried out by foot as usual, wherein, however, both arm 22 and cross member 20 remain rigid, so that there is no actuation path apart from, optionally, minimum deformation. However, a force applied in actuation direction B on either first or second pedal actuating surfaces 16, 18 causes a torque M about axis X. Since simultaneous actuation of both pedal actuating surfaces 16, 18 can be ruled out by the offset arrangement and by partition wall 26, the detected value of torque M can be used to identify—on the basis of the direction of the torque, i.e., on the basis of the sign of the determined value M—which of pedal actuating surfaces 16, 18 was actuated. The degree of actuation, i.e., the acting force, can be determined from the absolute value of torque M.

Value M of the torque detected by torque sensor 24 is evaluated by an evaluation unit 32 as shown schematically in FIG. 6. Depending on the sign, either an acceleration signal B1 is generated when first pedal actuating surface 16 is actuated or a brake signal B2 is generated when second pedal actuating surface 18 is actuated and transmitted to a vehicle controller 34. Acceleration signal B1 and brake signal B2 thereby have a value which is proportional to the absolute value of the torque 11 detected. Vehicle controller 34 effects a corresponding control of the drive or brake of vehicle 30 (not shown).

Pedal value generator arrangement 10 is particularly suitable for electric vehicles and for vehicles which are controlled optionally autonomously or manually; in the latter case, accelerator pedal generator 4 can be pivoted into the rest position as shown in FIG. 2. However, the application is not limited thereto.

The particularly simple construction shown is made possible by dispensing with parts which are movable during actuation in conventional driving and brake pedals, such as in particular return springs and joints. Nevertheless, pedal value generator arrangement 10 allows a full control of drive and brake of vehicle 30.

Here, the embodiment shown is intended to be an example and not intended to be limiting. In addition to the version shown, various alternatives are possible. In particular, the pivotability about the pivot axis S can be dispensed with and instead, for example, a rigid arm 22 can be used. If—for example for autonomous driving style—control of vehicle 30 is not desired, evaluation unit 32 can, in this case, ignore torque signal M, so that pedal value generator arrangement 10 can be used as a footrest. While the spatial and mechanical separation of first and second pedal actuating surfaces 16, 18 by partition wall 26 and the offset arrangement (see FIG. 5) is advantageous, one or both of these measures can also be dispensed with.

The invention claimed is:

1. A pedal value generator for a motor vehicle, comprising
a cross member with a first pedal actuating surface and a second pedal actuating surface arranged at a distance from the first pedal actuating surface,
and a sensor arrangement for detecting a torque of the cross member with respect to a torque axis arranged between the first and second pedal actuating surfaces and for supplying an electrical actuation signal as a function of the torque;
wherein
the cross member is arranged on a pedal arm,
the pedal arm is arranged at least substantially rigid with respect to an actuation by a force acting on the first and second pedal actuating surfaces,
wherein
the pedal arm is pivotable about a pivot axis between an operating position and a rest position,
the pivot axis forms an angle with the torque axis.

2. The pedal value generator according to claim 1, wherein
the cross member is arranged at least substantially rigid.

3. The pedal value generator according to claim 1, wherein
a locking member for locking the pedal arm in the operating position is provided.

4. The pedal value generator according to claim 1, wherein
a cylinder member is provided for adjusting the pedal arm.

5. The pedal value generator according to claim 1, wherein
a separating member is arranged between the first and second pedal actuating surfaces, the separating member extending at least substantially perpendicular to at least a portion of at least one of said pedal actuating surfaces.

6. The pedal value generator according to claim 1, wherein
the first and second pedal actuating surfaces are arranged at least substantially in parallel to one another,
the first pedal actuating surface is arranged offset relative to the second pedal actuating surface in an actuation direction.

7. The pedal value generator according to claim 1, comprising
an evaluation unit for evaluating the torque and for supplying an acceleration signal when an actuating force is acting upon the first pedal actuating surface, and for supplying a brake signal when an actuating force is acting upon the second pedal actuating surface.

8. A pedal value generator arrangement, comprising
a legroom of a motor vehicle,
and a pedal sensor according to claim 1 that is arranged therein.

9. A method for controlling a motor vehicle wherein
the detected torque of a pedal value generator according to claim 1 is evaluated and the motor vehicle is accelerated when an actuating force is acting upon the first pedal actuating surface and is decelerated when an actuating force is acting upon the second pedal actuating surface.

* * * * *

UNITED STATES PATENT AND TRADEMARK OFFICE
CERTIFICATE OF CORRECTION

| | | |
|---|---|---|
| PATENT NO. | : 11,307,605 B2 | Page 1 of 1 |
| APPLICATION NO. | : 17/071306 | |
| DATED | : April 19, 2022 | |
| INVENTOR(S) | : Dirk Neubauer | |

It is certified that error appears in the above-identified patent and that said Letters Patent is hereby corrected as shown below:

On the Title Page

Insert item (30):
--Foreign Application Priority Data
Nov. 15, 2019 (DE) ................... 10 2019 130979--

Signed and Sealed this
Twenty-third Day of April, 2024

Katherine Kelly Vidal
*Director of the United States Patent and Trademark Office*